United States Patent

Speth et al.

[11] Patent Number: 5,825,654
[45] Date of Patent: Oct. 20, 1998

[54] METHOD FOR LIMITING AXIAL ACCELERATIONS WITHOUT CONTOURING ERRORS

[75] Inventors: Wolfgang Speth, Grossbottwar; Wilhelm Westermeyer, Nürnberg, both of Germany

[73] Assignee: Siemens Aktiengesellschaft, München, Germany

[21] Appl. No.: 809,662

[22] PCT Filed: Sep. 15, 1995

[86] PCT No.: PCT/DE95/01280

§ 371 Date: Jun. 27, 1997

§ 102(e) Date: Jun. 27, 1997

[87] PCT Pub. No.: WO96/10221

PCT Pub. Date: Apr. 4, 1996

[30] Foreign Application Priority Data

Sep. 29, 1994 [DE] Germany .................... 44 34 923.8

[51] Int. Cl.⁶ .................................................. G05B 19/4103
[52] U.S. Cl. .................................. 364/474.3; 364/474.31; 364/179
[58] Field of Search ........................... 364/474.3, 474.31, 364/474.29, 167.01, 174, 179, 182; 318/571, 573, 567

[56] References Cited

U.S. PATENT DOCUMENTS 5,444,636   8/1995   Yoshida et al. .............. 364/474.3
5,528,506   6/1996   Yoshida et al. .............. 364/474.3

FOREIGN PATENT DOCUMENTS

| 0 254 884 | 2/1988 | European Pat. Off. | ........ G05B 19/42 |
| 0 320 515 | 6/1989 | European Pat. Off. | ...... G05B 19/407 |
| 0 413 825 | 2/1991 | European Pat. Off. | ...... G05B 19/407 |
| 0 440 805 | 8/1991 | European Pat. Off. | ...... G05B 19/407 |
| 0 530 032 | 3/1993 | European Pat. Off. | ...... G05B 19/407 |
| 0 530 033 | 3/1993 | European Pat. Off. | ...... G05B 19/407 |
| A 02 308311 | 12/1990 | Japan | ........... G05B 19/407 |
| A 05 073128 | 3/1993 | Japan | ........... G05B 19/407 |
| 2 131 977 | 6/1984 | United Kingdom | ........... G05D 13/62 |

*Primary Examiner*—Paul P. Gordon
*Assistant Examiner*—Steven R. Garland
*Attorney, Agent, or Firm*—Kenyon & Kenyon

[57] ABSTRACT

In a method for a velocity control of electric drives, which permits limiting of the axial accelerations without contouring errors, the required dynamic path limits being determined sufficiently accurately in advance in the vicinity of singular regions by determining the course of the machine axes before the interpolation in an approximate fashion by an approximation via polynomials of higher order and deriving a possibly required local path velocity limit or local path acceleration limit for each control data record with the aid of the global machine axis upper acceleration limits and machine axis upper velocity limits. Otherwise, the feed rate remains constant. The scanning increment for the approximation is variable and is adapted depending on the calculated machine axis loading by scanning the critical regions more finely.

3 Claims, 2 Drawing Sheets

METHOD FOR LIMITING AXIAL ACCELERATIONS WITHOUT CONTOURING ERRORS

FIELD OF THE INVENTION

The present invention relates to a method for a velocity control of electric drives.

BACKGROUND INFORMATION

In modern industrial controls for use, for example, in machine tools and robots, the problem frequently arises that the path velocity profile prescribed on the desired-value side in the form of the feed overshoots the possible axial velocity and axial acceleration and, as a result, there is an increase in the axial drag error, a velocity error in the longitudinal direction of the workpiece. Generally, the result of this on curved contours is also a contouring error on the workpiece to be produced. In addition, in the vicinity of singular regions, i.e., discontinuous points on the contours such as break points, the axial monitoring of the drag error of the machine is triggered and causes an immediate stoppage of the machine. Since, in view of the finest contours which are at present to be produced, the aim within the framework of narrow tolerances is to minimize by means of an axial drag error these copying errors which occur, there is the need to reduce the fundamental axial velocity and axial acceleration so that axial drag errors can be avoided.

It is known that conventional methods of velocity control for the purpose of fulfilling these requirements in machine tool controls, to the extent that they smooth the path velocity profile, either only take account of a flat-rate velocity-independent path acceleration limit and path velocity limit, or else derive these latter from the course of the machine axes or basic axes under greatly simplified conditions. These methods employed as standard for velocity control in machine tool controls have the disadvantage, however, that, on one hand, a permissible flat-rate acceleration limit has to be selected to be appropriately small in order to avoid axial drag errors and contouring errors caused thereby. As a result, however, the performance of the machine is not exploited. On the other hand, the conventional method, discussed above, for deriving a path acceleration limit and a path velocity limit has the result that the latter are calculated too coarsely for detection of abruptly occurring singular regions. The required dynamic path limits which could prevent triggering of the axial drag error monitoring are thus not determined with sufficient accuracy in the vicinity of singular regions. For this reason, the machine operator of small subprograms generally adapts the programmed feed to the acceleration possibilities of his machine manually by means of programmable acceleration limits. Such a mode of procedure has the disadvantage, however, that the manual adjustment of the velocity profile in the contouring is very uneconomic, since very extensive programs are run only a few times. An alternative to such a procedure includes approximating the courses of the machine axes. This is generally done via linear records (in this connection, see German Patent Application No. 36 23 070 or European Patent Application No. 0 254 884, for example). However, the latter mode of procedure has the disadvantage that the program outlay is thereby increased, it is no longer possible to change a tool correction subsequently and a clamping correction is then possible only to a very limited extent.

Japanese Patent Application No. 507 3128 describes a method for controlling feed rates which avoids an abrupt lowering of the feed rate. However, this Japanese Patent Application does not describe measures for optimum utilization of the performance of a machine being used in conjunction with a consideration of velocity limits and acceleration limits.

It is therefore the object of the invention to design a method for velocity control in such a way that the disadvantages represented above such as limiting the performance of the machine employed, a higher outlay due to manual adaptation and excessive programming outlay through approximating the courses of the machine axes can be avoided. Rather, local path acceleration limits and path velocity limits are to be derived from the machine axes in such a way that the required dynamic path limit can also be determined with sufficient accuracy in the vicinity of singular regions.

This object is achieved in accordance with the present invention by means of the following features:

1.1 the velocity characteristic of the machine axes is already determined approximately before the interpolation, and a possibly required local path velocity limit and/or local path acceleration limit is derived for each control data record with the aid of global machine axis velocity limits and machine axis acceleration limits, 1.2 the scanning increment for the approximation is variable in this case and is continuously adapted to the machine axis movements by scanning regions of low machine axis loading only coarsely while scanning critical regions, by contrast, finely, 1.3 except for the limitations required by the local path velocity limits and/or local path acceleration limits which have been determined, the feed rate along the path to be traversed is held for as long as possible at a prescribed constant value.

Another embodiment of the method according to the present invention, which permits, among other things an implementation with a particularly low outlay on programming and processing, is distinguished by the following features:

2.1 for the approximation of the actually occurring velocity characteristics of the machine axes, the contour to be described is scanned with the aid of the control data, and the scanned points are joined to form an approximated profile spectrum by polynomials of the order of three or higher, in particular cubic polynomials, 2.2 the polynomials are used to derive, as a function of the resulting characteristic path values, the axial velocity loading and axial acceleration loading which occur, 2.3 if the axial velocity loading and/or axial acceleration loading determined overshoots or undershoots the global machine axis velocity limits or machine axis acceleration limits, their values in these regions are set to the limiting value respectively overshot or undershot.

A further embodiment of the method according to the present invention simplifies the latter, in particular, by having the following feature:

3.1 instead of a feed rate with local limits which is as constant as possible, the minimum (M) of an approximated feed rate profile is determined, and traversing is performed at a constant feed rate over the entire path at this determined minimum.

Yet another embodiment of the method according to the present invention renders the latter particularly variable and permits flexible use by having the following feature:

4.1 the machine axis values are determined only in accordance with a coarse interpolation, over a contour to be described with the result that the method is independent of the respective machine kinematics.

Some of the advantages achieved using the present invention include, in particular, the adaptation of both the path acceleration limits and path velocity limits to the contour is automated and limitation is performed only where this is also indispensable. The interpolation can operate on the contour and conform the feed to the contour to the greatest possible extent. According to the present invention, the tool velocity is optimally controlled technically as long as this is possible without overloading the drives. In addition, the advantages set forth can be realized effectively, and at particularly favourable cost, by means of the present invention.

DETAILED DESCRIPTION OF THE INVENTION

Figure 1:
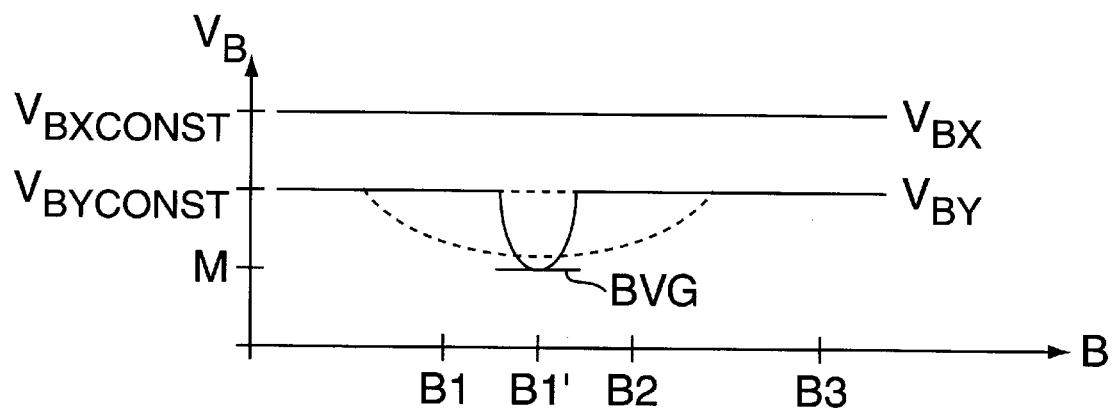
FIG. 1 shows a velocity characteristic in basic coordinates.

FIG. 1 is a diagram which represents in basic coordinates, that is to say the coordinates of the workpiece to be processed, the velocity characteristic of, for example, the tool of a machine tool. The abscissa describes the path length B, the ordinate gives the value of the velocity in basic coordinates $V_B$. Two velocity characteristics $V_{Bx}$ and $V_{By}$ are represented. These describe the velocity of the feed in the X- and Y-directions with which a tool machines the appropriate workpiece. However, the method according to the present invention can be applied at any time to higher dimensions—the representation is limited to two dimensions merely for the sake of better clarity. The aim is a feed which is as constant as possible, and this is illustrated by the linear course of the two velocities $V_{Bx}$ at the prescribed value VBxconst at VBy at the value $V_{Byconst}$. Since this ideal presentation cannot always be realized in reality, deviations from these linear velocity characteristics are also produced. These deviations are represented in two cases with the aid of $V_{By}$. This is firstly in the form of a dashed line in the course of which the velocity $V_{By}$ drops for a time firstly linearly, then polynomially to a local path velocity limit BVG and finally rises again linearly to $V_{Byconst}$. This course is determined by overshooting of a global machine axis acceleration limit. Secondly, a continuous line is used for this purpose, which line temporarily drops polynomially to a local path velocity limit BVG as a result of the overshooting of a global machine axis velocity limit. In these situations, clear kinks occur at the transitions. A minimum M occurs in each case owing to the course of each curve. The abscissa is subdivided into intervals B1, B2 and B3 and an intermediate interval B1' which dissects the interval B1 to B2. The local path velocity limit BVG is positioned exactly at B1'.

Figure 2:
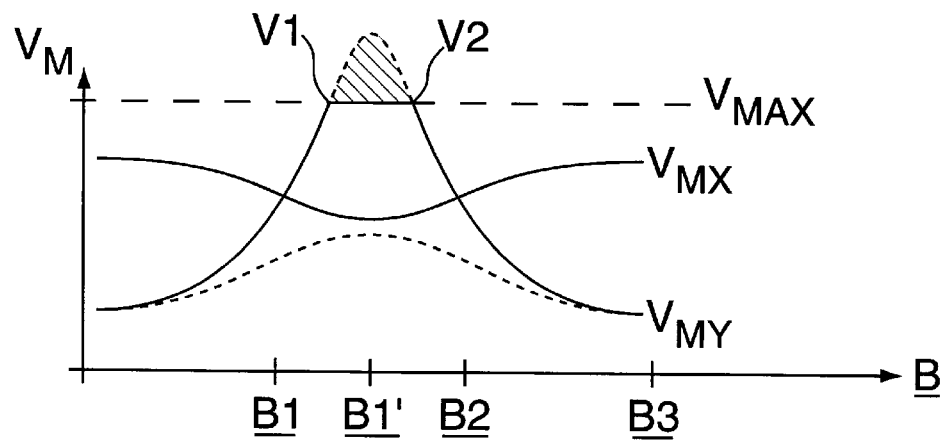
FIG. 2 shows an approximated velocity characteristic in machine axis coordinates.

FIG. 2 shows a diagram in which the approximated velocity characteristic of the electric drive is reproduced in machine axis coordinates. Represented, in turn, are the velocity characteristics in the X- and Y-directions $V_{Mx}$ and $V_{My}$. The abscissa describes the path length $\overline{B}$, this being subdivided into a plurality of intervals $\underline{B1}$, $\underline{B2}$, $\underline{B3}$, and an intermediate interval $\underline{B1'}$. The ordinate describes the velocity value in machine axis coordinates. The value $V_{max}$, illustrated using a dashed line, represents a global machine velocity limit for $V_{My}$, which the velocity characteristic of the electric drive is not permitted to overshoot. Taking as a basis a feed which is to move as constantly as possible over the entire path, the velocity $V_{Mx}$ varies within the permissible velocity range in the intervals B1 to B3. By contrast, in the interval from B1 to B2 the velocity $V_{My}$ overshoots the global machine velocity limit $V_{max}$ and at the intermediate interval $\underline{B1'}$ reaches its maximum value, which is indicated by a dotted curve. The area under this curve is accentuated in the region of the overshooting of the limiting value. A corrected velocity characteristic of $V_{My}$, situated in the permissible velocity range, is represented by a continuous curve which largely follows the ideal course just described but does not overshoot the extreme range, but rather is limited to the limiting value $V_{max}$ in this phase between the points $\underline{V1}$ and $\underline{V2}$. A second permissible velocity characteristic of $V_{My}$ is represented in the form of a dashed curve and is based on a correction on the basis of overshooting of the global machine acceleration limits.

Figure 3:
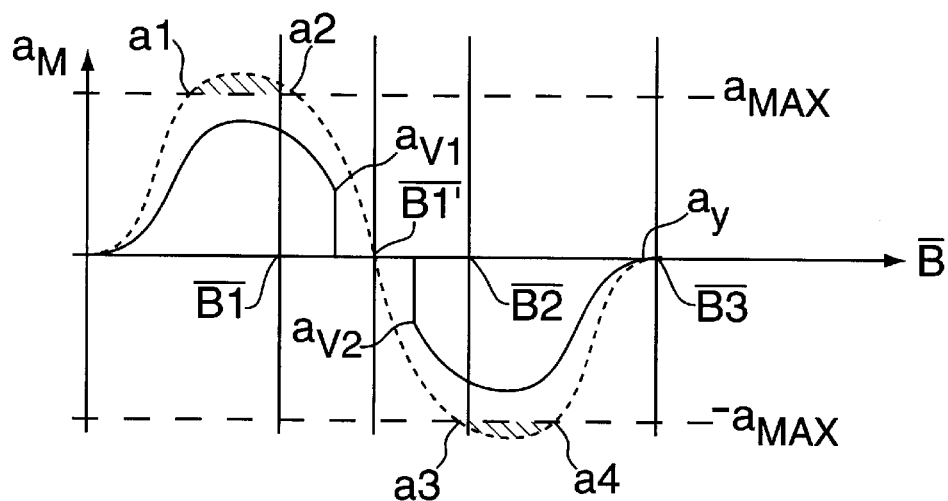
FIG. 3 shows an acceleration characteristic in machine axis coordinates.

FIG. 3 shows a diagram in which the acceleration $a_M$ for the velocity characteristic $V_{My}$ from FIG. 2 is represented against the path length $\overline{B}$. The path length is, as already shown in FIGS. 1 and 2, subdivided into intervals $\overline{B1}$, $\overline{B2}$ and $\overline{B3}$ as well as the intermediate interval $\overline{B1'}$. A global machine axis acceleration limit $a_{max}$ or $-a_{max}$ is shown on the ordinate, respectively in the positive acceleration range and in the negative acceleration range. The acceleration characteristic ay, which is represented by a continuous line, corresponds to the velocity characteristic $V_{My}$ which extends in FIG. 2 for a time on the global machine velocity limit there and is likewise represented in the form of a continuous line. Here, the acceleration rises sinusoidally, in a case represented for the purpose of illustration, until reaching a local maximum, and subsequently drops as far as the point $a_{V1}$. There, the acceleration drops abruptly to zero because of the velocity correction between V1 and V2 in FIG. 2. The same characteristic, mirrored on the abscissa, is described in the negative acceleration range. At the point V2, the acceleration drops abruptly to $a_{V2}$, in which case it holds that $a_{V2} = -a_{V1}$, and then again reaches the abscissa with an acceleration of zero.

In a second characteristic of the acceleration in machine axis coordinates $a_y$, which is represented in the form of a dashed curve, a case is sketched in which $a_y$ overshoots or undershoots, respectively, the global acceleration limit $a_{max}$ and $-a_{max}$. In a way similar to the overshooting of velocity in FIG. 2, the characteristic of $a_y$ is limited to the corresponding acceleration limit $a_{max}$ or $-a_{max}$, respectively, in these ranges a1 to a2 with respect to overshooting, and a3 to a4 with respect to undershooting. The abscissa intersects $a_y$ exactly at $\overline{B1'}$ in this second case. This acceleration characteristic drawn as dashes and limited in maximum acceleration affects the corresponding velocity characteristic, specifically the characteristic of $V_{My}$ likewise represented by dashes in FIG. 2, in such a way that because of the local acceleration limitation the characteristic of $V_{My}$ likewise no longer exceeds the associated global machine axis velocity limit $V_{max}$. The two regions, which lie outside the acceleration limits, are accentuated graphically in FIG. 3.

Figure 4:
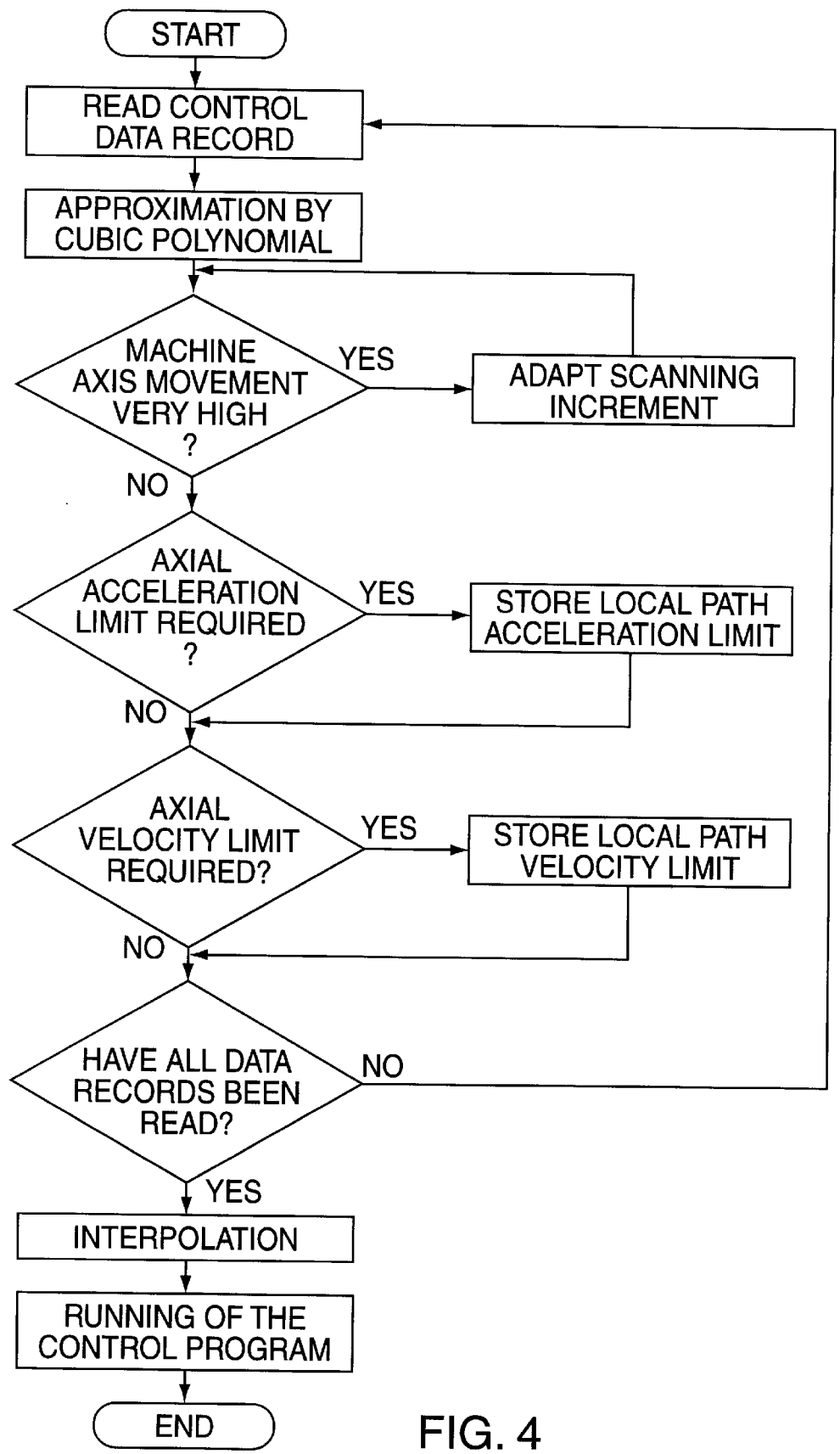
FIG. 4 shows a flowchart for limiting axial accelerations without contouring errors according to the present invention.

A flowchart which represents the individual method steps according to the present invention is shown in FIG. 4. After the start, a control data record is read in a first processing step. Following this step, the scanned points contained therein are used to produce an approximation by means of a cubic polynomial or a polynomial of higher order. A check is made in a first branch as to whether the machine axis movements derived therefrom are very high, that is to say whether they lie outside the global machine axis limits of velocity $V_{max}$ from FIG. 2, and axial acceleration, $a_{max}$ or $-a_{max}$ from FIG. 3, or else can overshoot these within the current cycle. If this is the case, the scanning increment is adapted and a return is made to before the first branch. If not required, a second branch ensues in which a check is made as to whether it is necessary to insert an axial acceleration limit. If this is the case, a local path acceleration limit conditioned thereby is determined and stored. This is followed in both cases by continuing with a third branch. It is checked in the latter whether an axial velocity limit is required. If yes, an associated local path velocity limit is determined and stored. Likewise, in both cases a jump is made to a fourth branch in which it is checked whether all the data records have already been read. If this is not the case, the first processing step is continued, specifically reading a further control data record. If all the data records have been read, this is followed by performing the standard method for processing control data records by interpolating the path to be described in a further processing step, and running the control program in a processing step following thereupon. The method is concluded upon running of the control program.

In order to achieve a limitation of the axial acceleration according to the present invention without contouring errors, in which it is possible to proceed for as long and as far as possible with a constant feed rate $V_{Bxconst}$ or $V_{Byconst}$, the required dynamic path limits must be determined with sufficient accuracy in the vicinity of singular or non-tangential regions. For this reason, the course of the machine axes is determined approximately before the interpolation and a possibly required local path velocity limit BVG or local path acceleration limit is derived for each control data record with the aid of the machine axis acceleration limits $a_{max}$ or $-a_{max}$ and machine axis velocity limits $V_{max}$. In order to approximate the courses of the machine axes, which are to be approximated in the light of the maxim of a constant feed, the contour is determined with the aid of the scanned points of the control data records over the path length B or $\underline{B}$ or $\overline{B}$ in accordance with a coarse interpolation, and the individual scanned points are connected to one another in defined interpolation intervals B1, B2, B3 via cubic polynomials or ones of higher order (see, in this connection, Schrüfer, E.: Signalverarbeitung; Numerische Verarbeitung digitaler Signale, Munich, Vienna; Hanser Verlag 1990, p. 74ff). The velocity characteristic which results assuming a constant feed of the velocity characteristic in basic coordinates $V_{Bx}$ and $V_{By}$ is calculated in machine axis coordinates $V_{Mx}$ and $V_{My}$ from the cubic polynomials as a function of the characteristic values of the velocity characteristic which are determined in this case. The variation curves shown in FIG. 3 are based on a transformation between the basic and the machine axis coordinate systems. The axial velocity loading so determined is, moreover, used to derive the basic axial acceleration loading, which for the sake of simplicity is shown in FIG. 3 only for movement in the Y-direction with the aid of the characteristic $a_y$. In this case, both the variation in the axial velocity loading $V_{Mx}$ and $V_{My}$ and the axial acceleration loading $a_y$ are examined with respect to a global machine velocity limit Vmax and global machine acceleration limits amax and $-a_{max}$, at the respective interpolation intervals B1, B2, B3. If it is determined in this case that the machine axis movements overshoot or undershoot either the global machine velocity limit $V_{max}$ or the global machine acceleration limit $a_{max}$ or $-a_{max}$, or else that on the basis of the values determined the machine axis movement threatens to overshoot or undershoot the said machine limits in the current or subsequent interval, the scanning increment is matched to the machine axis movement, as a result of which critical intervals are detected in this way and large intervals are more finely scanned. Such a case occurs in the interval from B1 to B2, for which reason an intermediate interval B1' is adopted as further scanned point. As a result, singular regions which contain discontinuous points such as jumps or break-points, are detected reliably and finely scanned. Regions of low machine axis loading are only coarsely scanned, and no unnecessary computing time is consumed. The scanning thus takes account automatically of the profile spectrum effectively approximated via cubic polynomials or ones of higher order.

In order to be able to operate with constant feed rate $V_{Bxconst}$ and $V_{Byconst}$ in the basic coordinate system, the carriage velocities in the X- and Y-directions, that is the velocity characteristic in machine axis coordinates, must as a rule change continuously. It is important that they lie within the scope of the machine loading limits, since otherwise drag errors, which entail contouring errors, can occur. For this reason, according to the present invention the feed is to be kept constant only as long as this is possible within the scope of the machine axis loading limits. Otherwise, the feed rate must be adapted. Such a requirement occurs in one of the first cases, specifically the continuous curve of the variation of $V_{My}$ in the interval from B1 to B2. Since the approximated velocity characteristic in the machine axis coordinates in the Y-direction $V_{My}$ overshoots the global machine velocity limit $V_{max}$, for example because of a kink which is to be traversed in the path guidance, the axial velocity in the Y-direction must be limited and a required path velocity limit must be derived for this data record. The axial velocity curve in the Y-direction $V_{My}$ which thereby results and is adapted to the global machine velocity limit $V_{max}$, is yielded by cutting off the accentuated overshooting region between V1 and V2 and limiting $V_{My}$ to $V_{Max}$. Since, in the case sketched here, the corresponding acceleration characteristic in machine axis coordinates $a_y$, likewise represented in the form of a continuous curve in FIG. 3, also does not extend outside the global machine axis acceleration limits, no further correction is required in this regard. However, as a result of the velocity correction on VMy, the acceleration drops abruptly to ZERO both for V1 and V2.

The result of this procedure is that it is no longer possible to maintain a constant feed rate in basic coordinates in the Y-direction in the interval from B1 to B2, but that a local path velocity limit BVG has to be accepted at the intermediate interval B1'. The abrupt severance of the overshoot region also gives rise in the case of $V_{By}$ to a discontinuous transition, the variation in the local path velocity limit BVG being calculated as a difference as a function of the underlying coordinate transformation, and describing as a rule an inverse curve analogous to the severed overshoot region. However, an axial drag error otherwise occurring and the contouring error associated therewith on curved contours can thus be avoided on the workpiece.

In addition to the global machine axis velocity limit $V_{max}$ a requirement to derive a necessary local path velocity and/or path acceleration limit can result from the approximated acceleration characteristic in machine axis coordinates. Thus, with the aid of the second characteristic of $a_y$, shown in FIG. 3 with the aid of a dashed curve, it becomes clear that the approximated acceleration characteristic in the Y-direction already overshoots the upper machine axis acceleration limit amax in the interval $\overline{B1}$. The same occurs in the negative acceleration range for $\overline{B2}$, where the negative machine axis acceleration limit $-a_{max}$ is undershot. The machine acceleration loading ay occurring thereby would thus have been attended by machine axis accelerations which can possibly entail contouring errors. Since a critical interval is concerned here, the scanning increment is adapted in accordance with the high machine axis movement, and an intermediate interval $\overline{B1'}$ is inserted. It is also possible in this case to reduce the scanning increment before the interval $\overline{B1}$ and after $\overline{B2}$. Because of the overshooting of the global machine axis acceleration limits $a_{max}$ and $-a_{max}$, the acceleration is limited in each case locally to the maximum between the interval points a1 and a2, and limited in each case locally to the minimum between the interval points a3 and a4. The required corrected acceleration characteristic ay is described by a dashed line in FIG. 3 which extends from a2 to a3 with a negative gradient and intersects the abscissa precisely at $\overline{B1'}$. The effect of this limitation of the acceleration $a_y$ on the velocity characteristic in machine axis coordinates $V_{My}$ is that $V_{My}$ varies linearly in each case between a1 and a2 and between a3 and a4. The consequence of this case for the feed rate in basic coordinates is that a local path velocity limit and/or path acceleration limit occurs, with $V_{By}$ deviating from the desired constant characteristic between a1 and a4. In this case, because of the linear increase in velocity of $V_{My}$ the deviation starts and ends non-tangentially.

Also the curves for the two cases are not represented true to scale relative to one another; rather, these are merely schematic sketches.

The result of taking account, according to the present invention, both of global machine velocity limits $V_{max}$ and of global machine axis acceleration limits $a_{max}$ and $-a_{max}$, together with the local path acceleration limits and path velocity limits necessarily derived therefrom, is that limitations, and thus restrictions, are imposed on the performance of the machine only where they are absolutely necessary. This results both in optimum utilization of the performance of the drive and in excluding the occurrence of contouring errors and of a triggering of axial drag error monitoring, which lead to a immediate stoppage of the machine.

In yet a further embodiment of the method according to the present invention, the procedure is such that instead of determining a feed rate which is as constant as possible and local limits, the minimum M of such a feed rate profile is determined. Subsequently, the entire path is traversed at a constant feed rate of M. This mode of procedure is less compute-bound and simpler to implement. However, it ensures nevertheless that neither the global machine axis velocity limit nor the global machine axis acceleration limit are overshot. Since the method in accordance with the present invention is intended to be as flexible and variable as possible, the machine axis values are determined in accordance with a coarse interpolation over the contour to be described. The method is thus independent of the respective machine kinematics and offers the possibility, moreover, of taking account of transformations, as well as workpiece lengths and radius corrections. Moreover, any desired method can be used for curve interpolation or fine interpolation.

What is claimed is:

1. A method for controlling a velocity of an electric drive, comprising the steps of:

determining approximate velocity characteristics of machine axes;

deriving at least one of a local path velocity limit and a local path acceleration limit for each of a plurality of control data records using global machine axis velocity limits and machine axis acceleration limits;

continuously adapting a scanning variable approximation increment to movements of the machine axes by coarsely scanning regions of low machine axis loading and by finely scanning critical regions of machine axis loading;

maintaining a feed rate on a path being traversed at a substantially constant predetermined value within the derived local path velocity and local path acceleration limits.

2. The method according to claim 1, wherein the step of determining the approximate velocity characteristics includes:

scanning a contour using the control data records;

joining scanned points of the contour to form an approximated profile spectrum using polynomials of an order of at least three;

using the polynomials to derive an axial velocity loading and an axial acceleration loading as a function of characteristic path values;

setting the axial velocity loading to the global machine axis velocity limit if the axial velocity loading derived exceeds the global machine axis velocity limit; and setting the axial acceleration loading to one of the machine axis acceleration limits if the axial acceleration loading derived is less than or greater than the machine axis acceleration limits.

3. The method according to claim 1, further comprising the step of:

determining values of the machine axes as a function of a coarse interpolation over a contour, wherein the method is independent of machine kinematics.

* * * * *